(12) United States Patent
Schumacher et al.

(10) Patent No.: US 7,934,365 B2
(45) Date of Patent: May 3, 2011

(54) TINE FOR AN AGRICULTURAL IMPLEMENT

(75) Inventors: Gustav Schumacher, Eichelhardt (DE);
Friedrich-Wilhelm Schumacher,
Eichelhardt (DE)

(73) Assignee: Gustav Schumacher (DE)

( * ) Notice: Subject to any disclaimer, the term of this patent is extended or adjusted under 35 U.S.C. 154(b) by 232 days.

(21) Appl. No.: 12/084,278

(22) PCT Filed: Oct. 4, 2006

(86) PCT No.: PCT/EP2006/009568
§ 371 (c)(1),
(2), (4) Date: Apr. 29, 2008

(87) PCT Pub. No.: WO2007/051514
PCT Pub. Date: May 10, 2007

(65) Prior Publication Data
US 2009/0229236 A1    Sep. 17, 2009

(30) Foreign Application Priority Data

Oct. 31, 2005 (DE) .................... 10 2005 052 394

(51) Int. Cl.
*A01D 78/00* (2006.01)
*A01D 89/00* (2006.01)
(52) U.S. Cl. .......................................... 56/400; 56/364
(58) Field of Classification Search ............... 56/14.4, 56/16.1, 219–227, 364, 400, 400.16, 400.21, 56/DIG. 21
See application file for complete search history.

(56) References Cited

U.S. PATENT DOCUMENTS

| | | | | |
|---|---|---|---|---|
| 2,432,653 A | * | 12/1947 | Bloom | 56/400 |
| 3,460,629 A | * | 8/1969 | West et al. | 172/21 |
| 3,626,678 A | * | 12/1971 | Quam | 56/400 |
| 3,796,030 A | * | 3/1974 | Neal et al. | 56/220 |
| 4,038,810 A | | 8/1977 | Williams et al. | |
| 4,589,497 A | * | 5/1986 | Kovar | 172/707 |
| 4,630,432 A | * | 12/1986 | Love et al. | 56/220 |
| 4,901,511 A | | 2/1990 | Yarmashev | |
| 6,199,357 B1 | * | 3/2001 | Bloom | 56/220 |
| 6,591,598 B2 | * | 7/2003 | Remillard et al. | 56/226 |
| 6,907,720 B2 | * | 6/2005 | Schumacher et al. | 56/400 |
| 2001/0009093 A1 | * | 7/2001 | Majkrzak | 56/220 |
| 2005/0091955 A1 | * | 5/2005 | Glazik et al. | 56/220 |
| 2007/0289280 A1 | * | 12/2007 | Marquardt | 56/16.1 |
| 2009/0056295 A1 | * | 3/2009 | Lolley | 56/220 |

FOREIGN PATENT DOCUMENTS

| | | | |
|---|---|---|---|
| DE | 1778379 U | * | 11/1958 |
| DE | 2 006 743 | | 9/1970 |
| DE | 20 06 743 A1 | | 9/1970 |
| DE | 210822 A1 | * | 6/1984 |
| GB | 2 126 066 A | | 3/1984 |

* cited by examiner

*Primary Examiner* — Thomas B Will
*Assistant Examiner* — Joan D Misa
(74) *Attorney, Agent, or Firm* — Harness, Dickey & Pierce, P.L.C.

(57) ABSTRACT

Tines (1) attached to a supporting body (2) have a gripping element (3) and a fastening element (4). The gripping element (3) has a bar-shape design and is made from plastic. The fastening element (4), made from spring steel, has a connecting section (11) connected to the gripping device (3). Also, the fastening element (4) has a fastening section (12) that fastens to the supporting body (2). An elastically resilient spring section (13) is arranged between the fastening section (12) and connecting section (11).

17 Claims, 11 Drawing Sheets

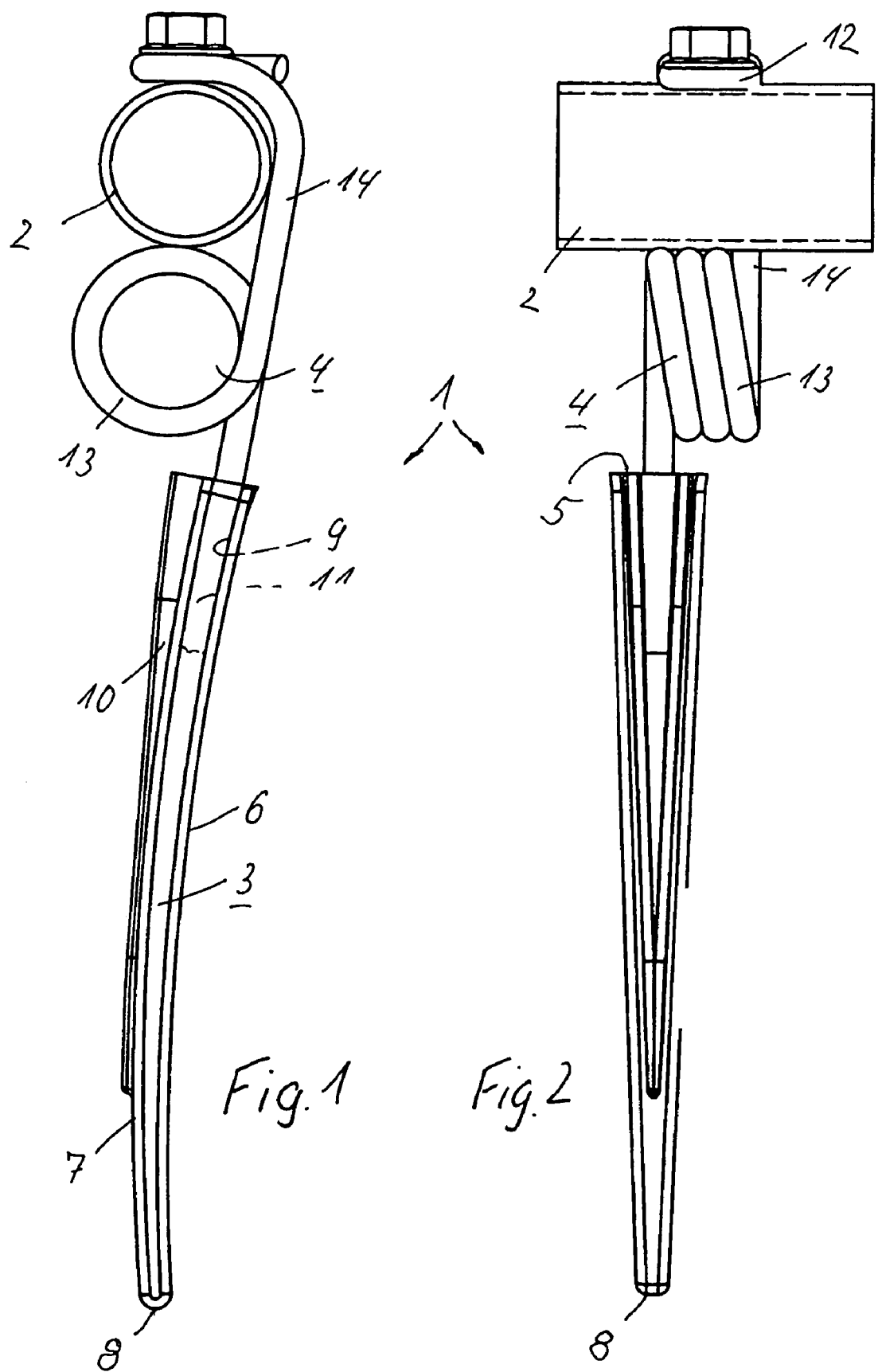

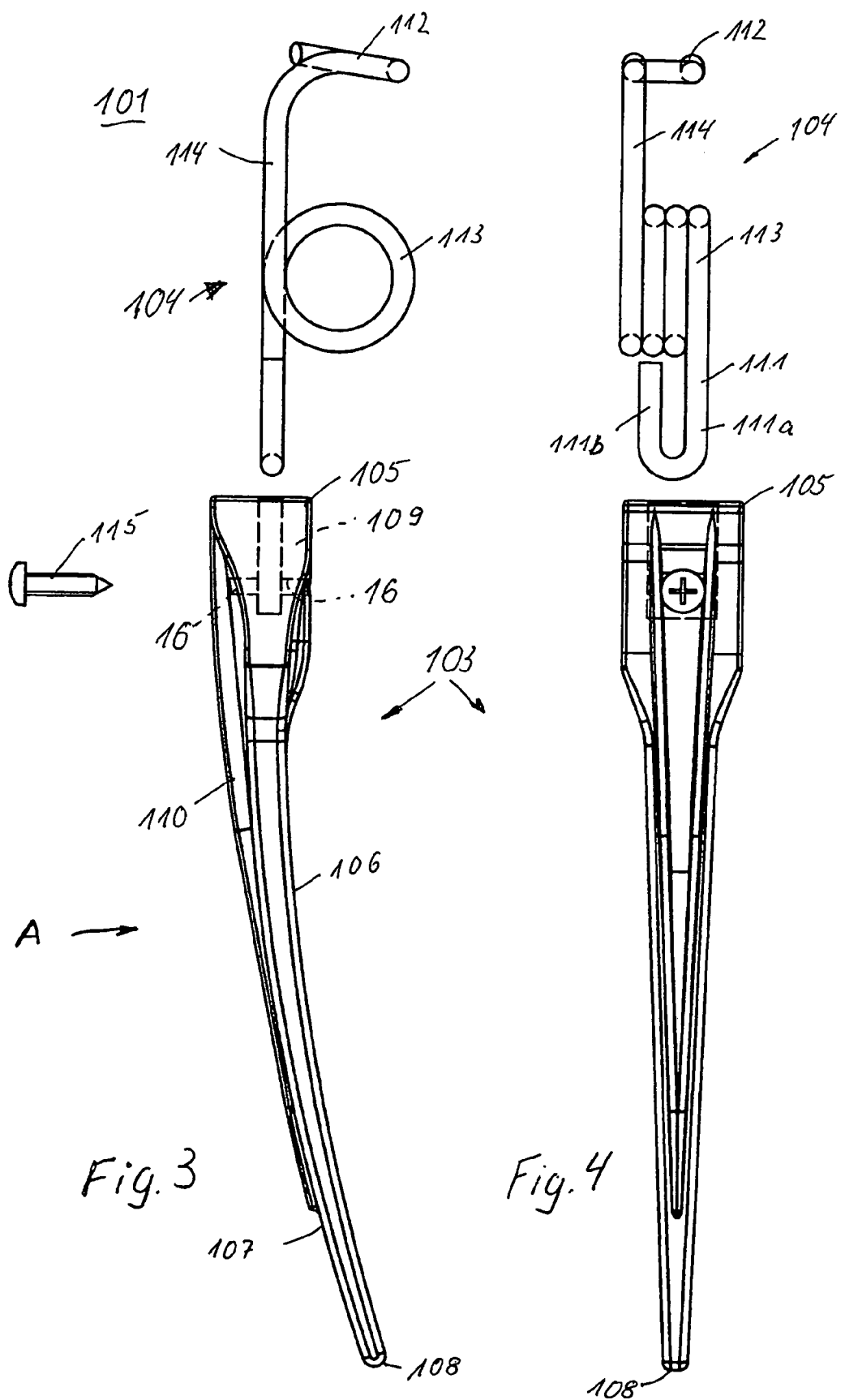

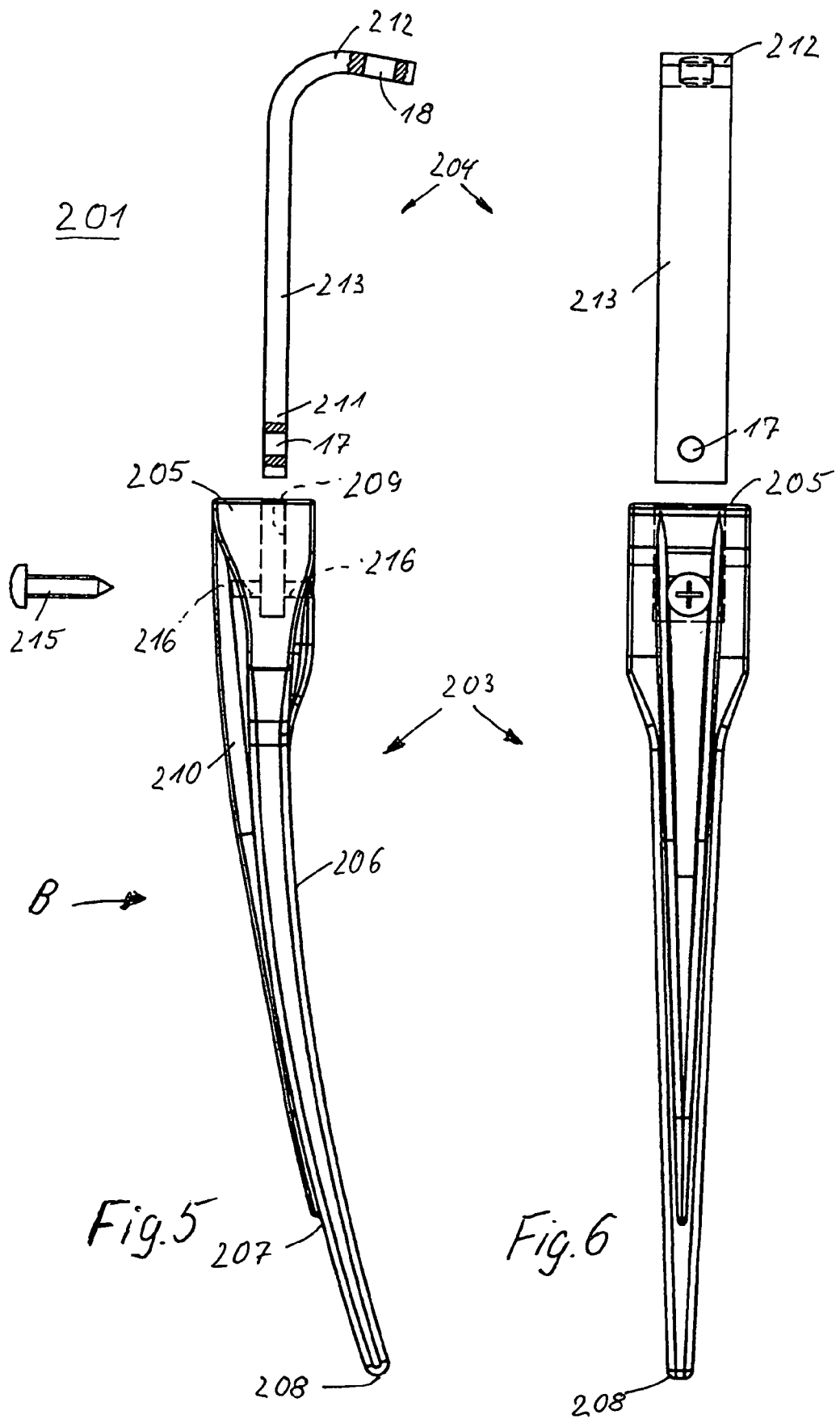

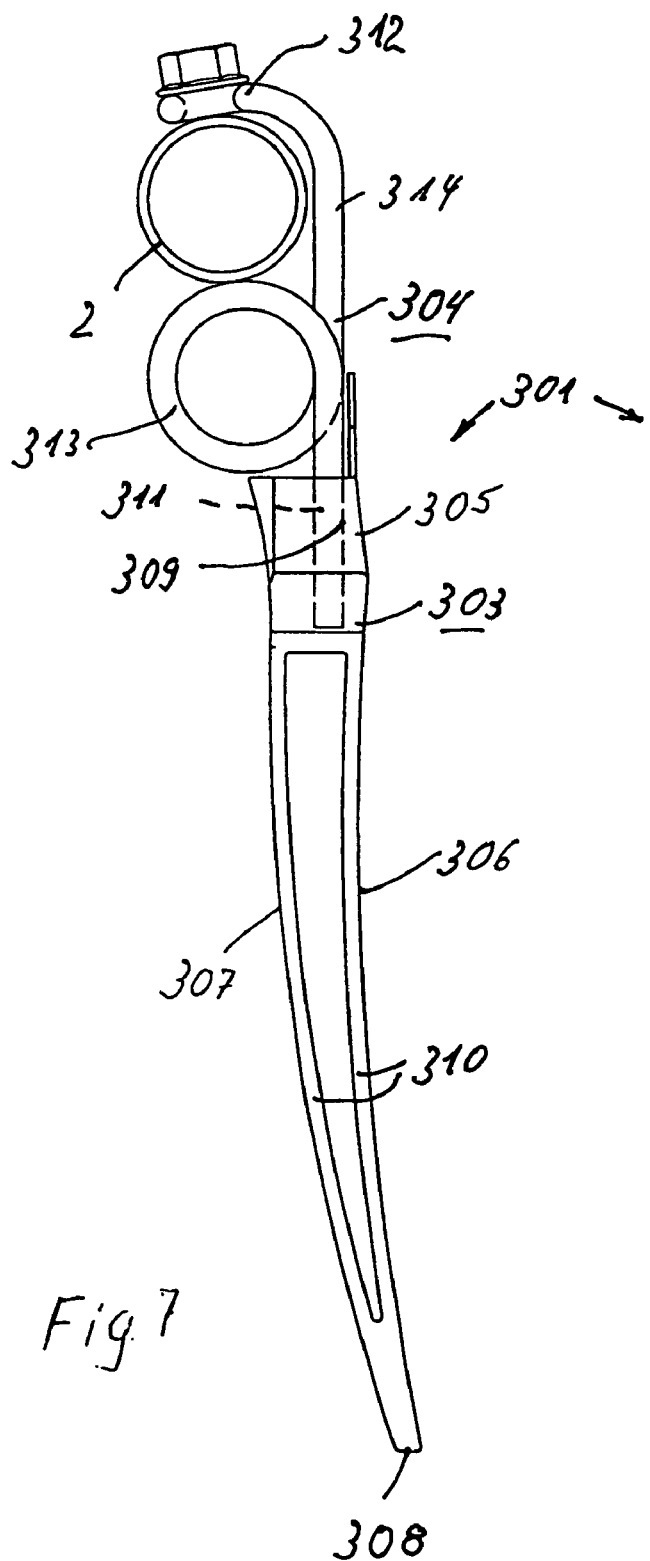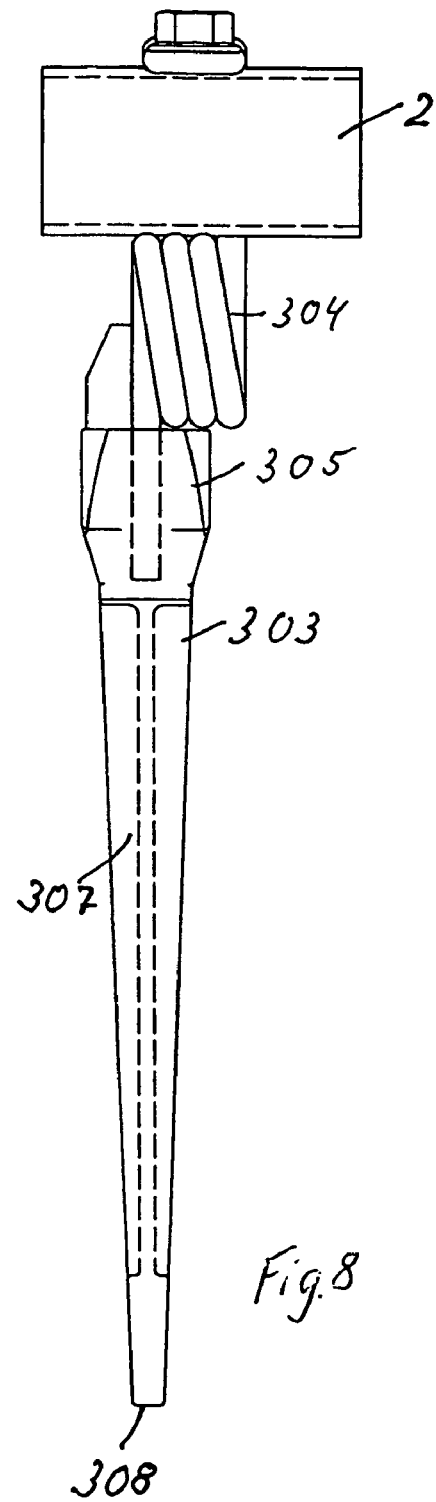
Fig. 7
Fig. 8

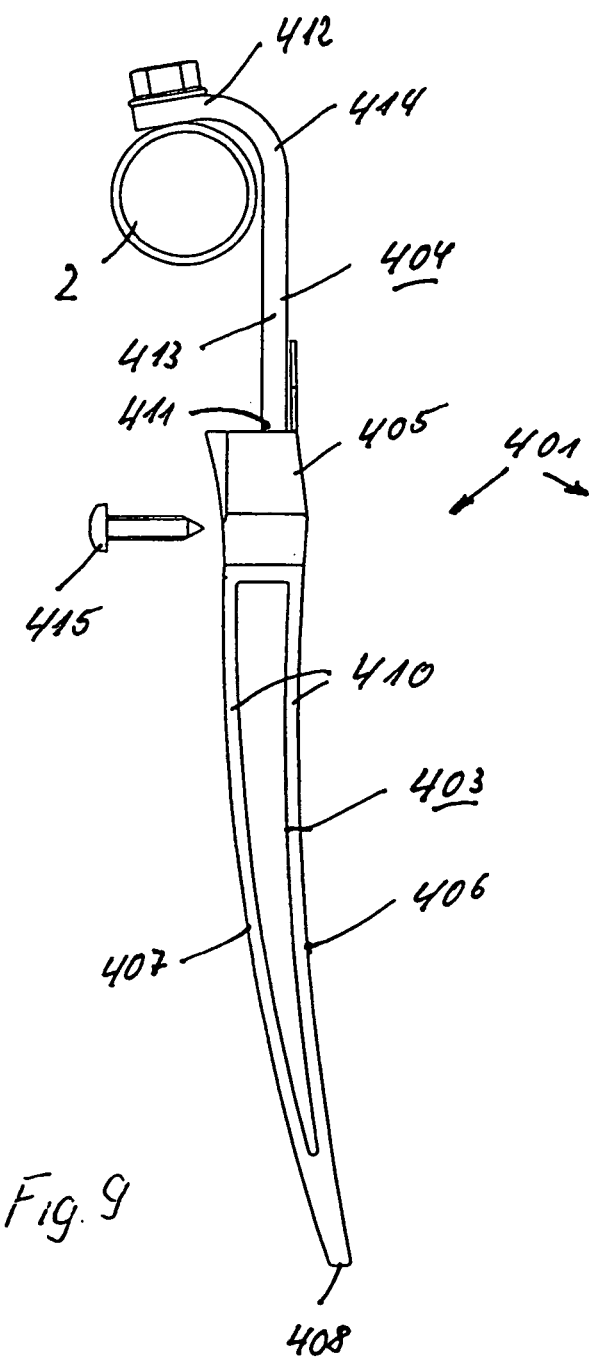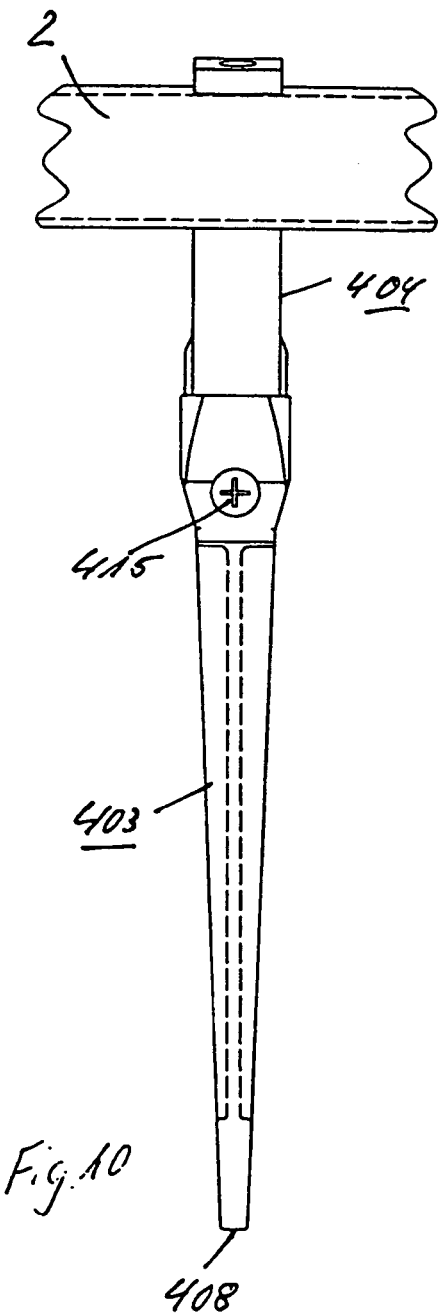
Fig. 9
Fig. 10

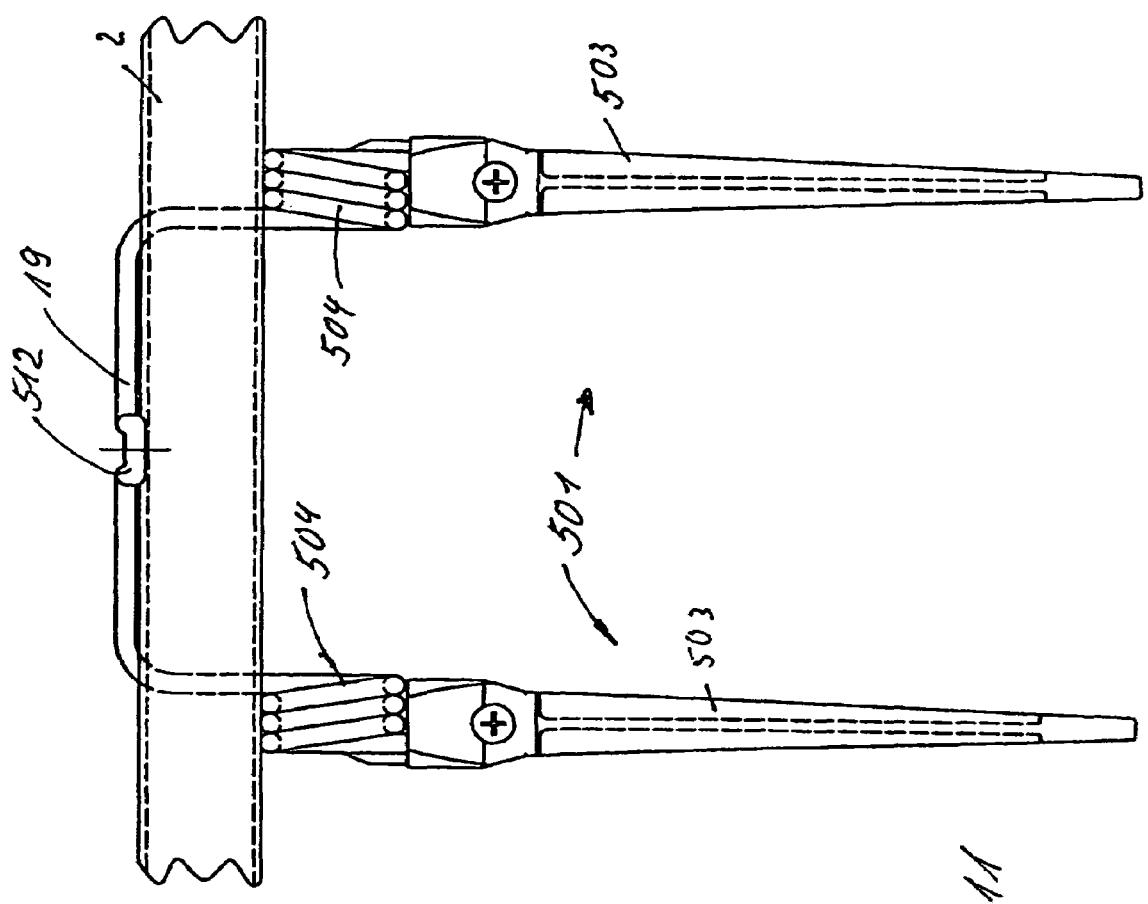

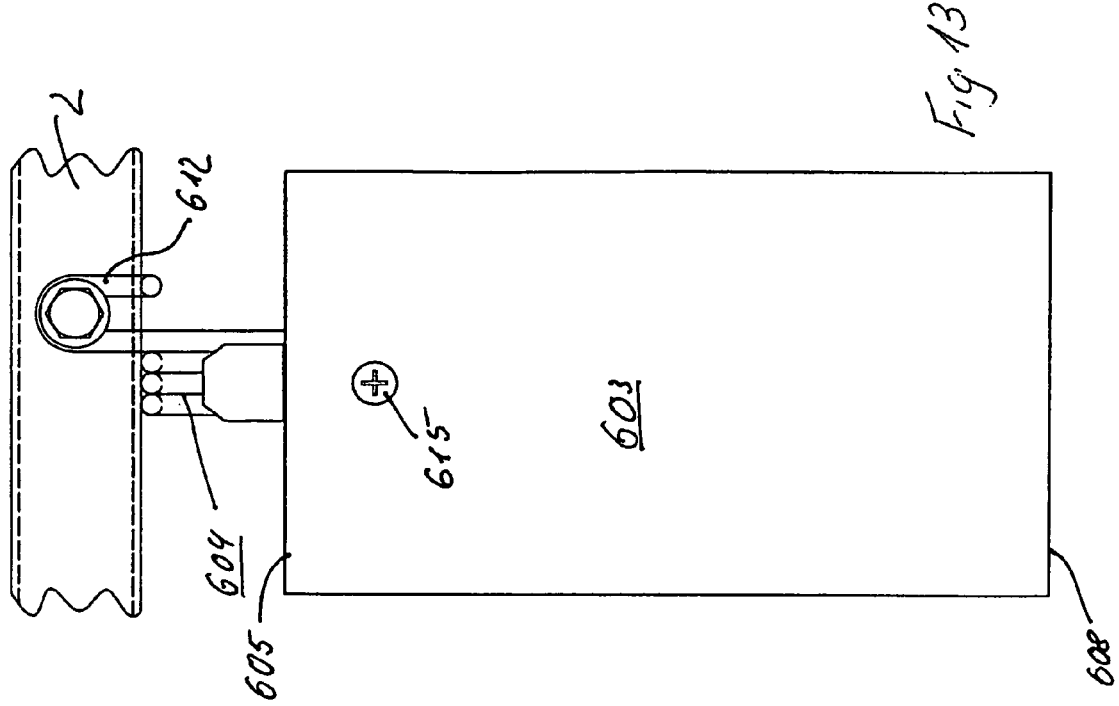
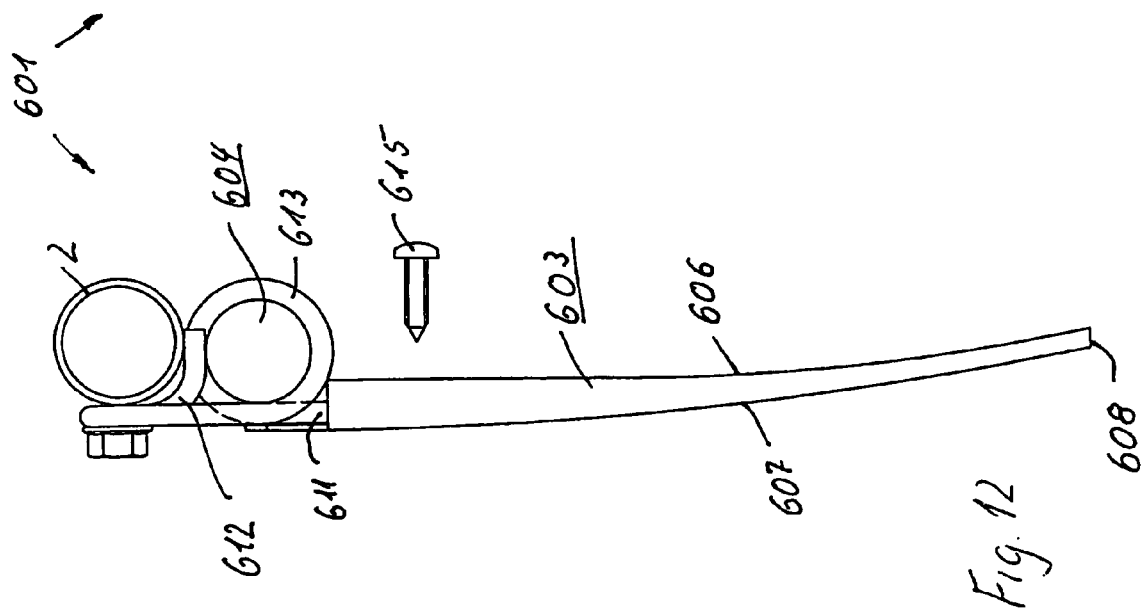

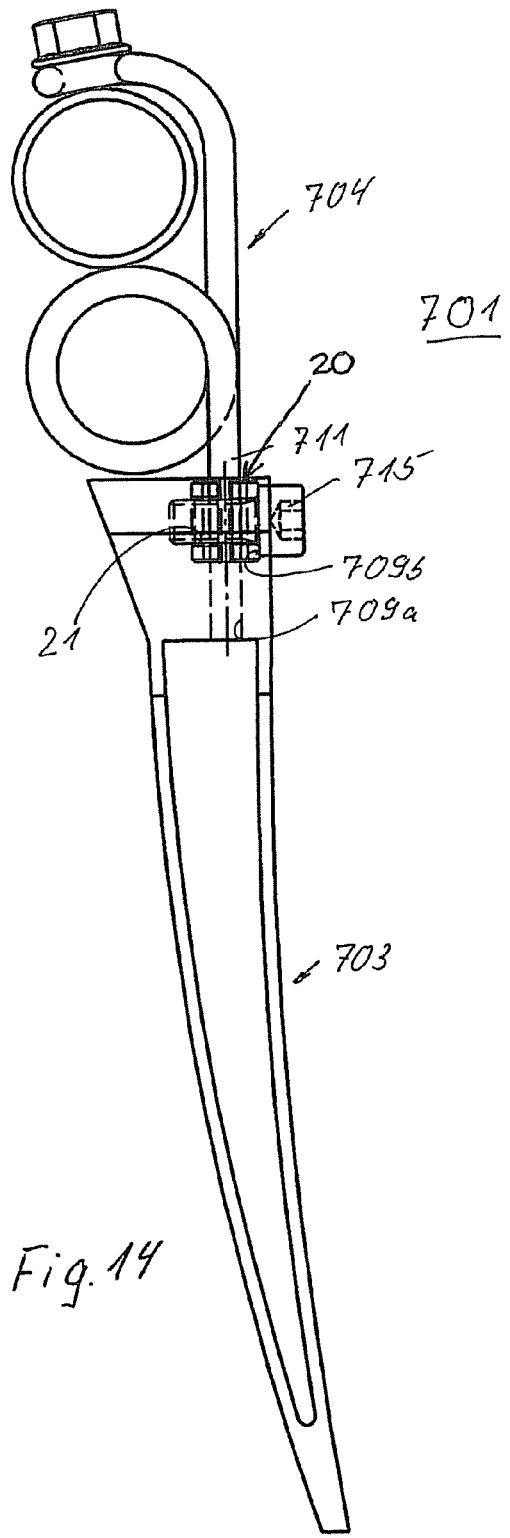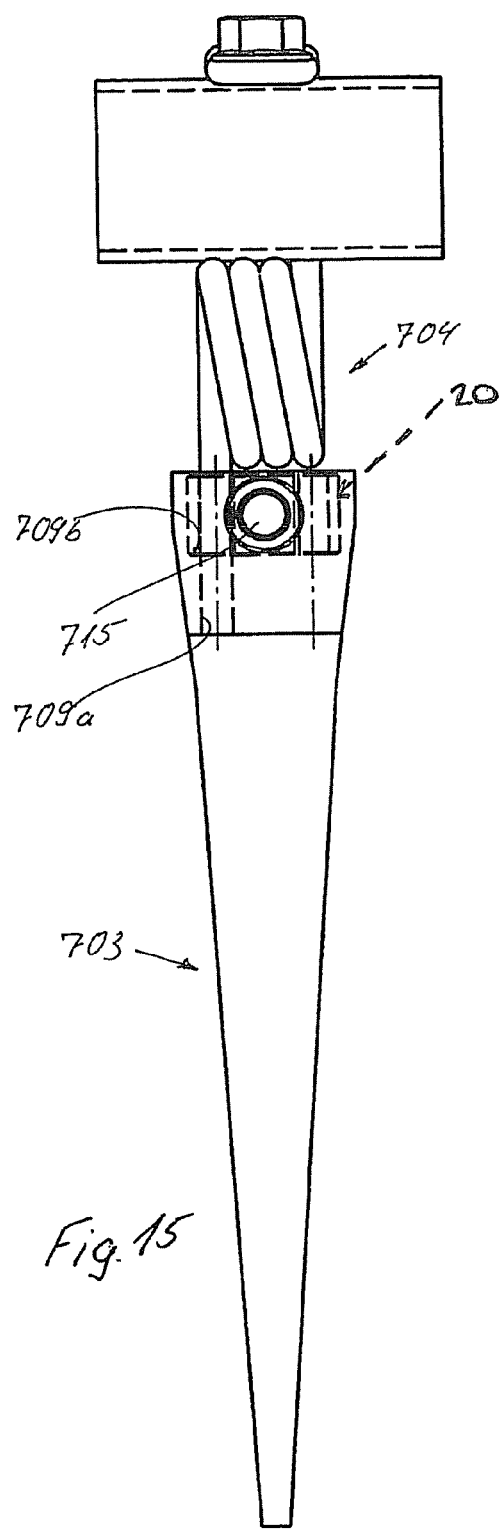
Fig. 14
Fig. 15

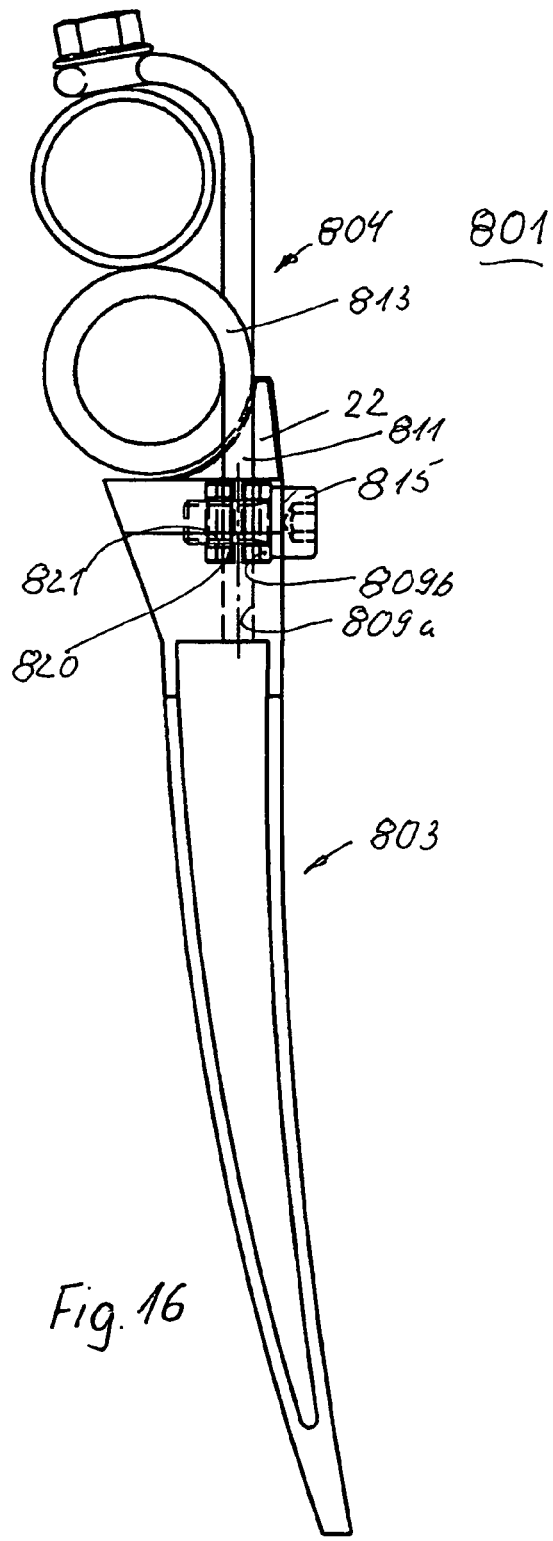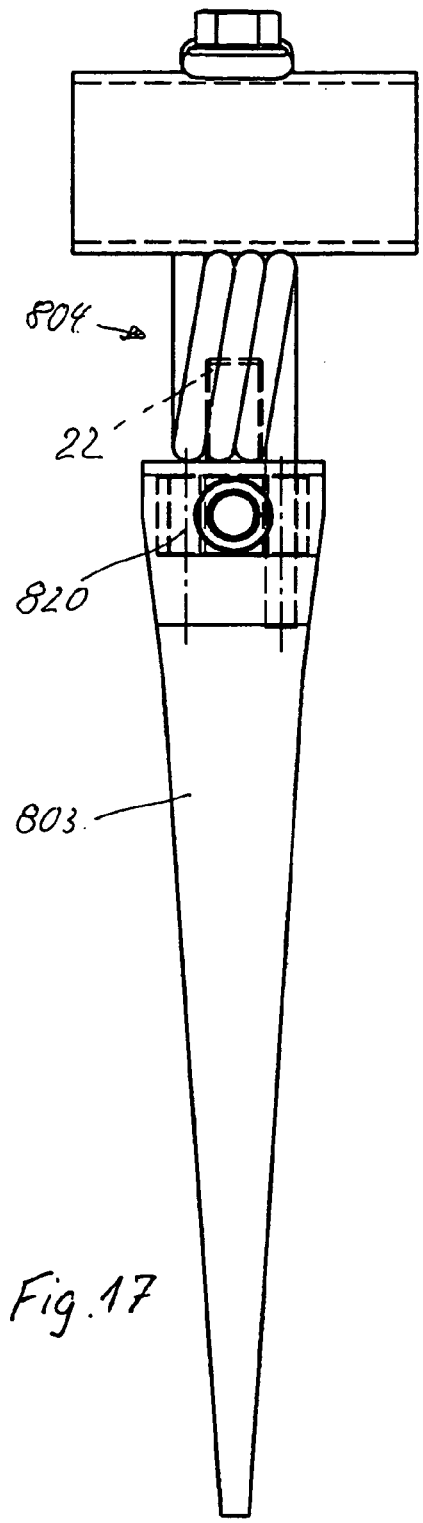
Fig. 16
Fig. 17

TINE FOR AN AGRICULTURAL IMPLEMENT

CROSS-REFERENCE TO RELATED APPLICATIONS

This application is a National Stage of International Application No. PCT/EP2006/009568, filed Oct. 4, 2006, which claims priority to German Patent Application No. 102005052394.3-23, filed Oct. 31, 2005. The disclosures of the above applications are incorporated herein by reference.

FIELD

The disclosure relates to a tine for an agricultural implement or a self-propelled working machine and, especially, to a tine attached on a support body of a reel. For example, it is used in connection with a harvesting machine.

BACKGROUND

The reel of a harvesting machine generally includes several support bodies that are radially distanced to and circumferentially distributed around a central tube. The support bodies can be formed as tubes or in any other profile. The support bodies are rotatably supported by corresponding support arms that are connected to the central tube. The reel is rotatable around the axis of the central tube. Commonly, at least 40 tines are attached on a reel for each support body to provide a working width of 6 meters. The design of the tine depends on the application of the harvesting machine. Tines made from spring steel wire are known. These tines are preferentially used with harvesting goods that are difficult to grip and to pull into the cutting trough, for example, cereals or grass, especially when they, because of the harvesting situation, rest on the ground. The tines generally have two or more spring windings between their attachment portion, with which they are attached on the support body, and the rod like gripping area. The tines contact the harvesting goods, via the windings, so that the gripping area can get out off the way, when it is heavily loaded.

For other harvesting goods, especially leguminous plants, for example beans, tines made from a plastic material are preferably used. These harvesting goods have to be cut very close to the ground, to collect all the fruit. Here, very wide cutting tables are used on the harvesting machines, for example, a combine harvester, that has a flexible cutter bar. The cutter bar is guided with ground contact in front of the cutting table. When the ground is uneven, these flexible cutter bars carry out a vertical movement relative to the cutting table. Thus, the cutter bar is lifted off the ground and approaches the tine moving above the same. In this case interferences are produced so that the tines can get between the reciprocatingly moving knife blades. If tines made from steel are used, the blades rip off. In this case the cutter bar can break and the cutter drive can be overloaded. The resulting repair times are undesirable during the harvesting work which depends on the weather.

Further, the loss of time has a larger effect than the cost for the repair. Because of this reason, tines are used in flexible cutter bars or for such application conditions that consist of an elastic material, for example, a nylon material, so that when such a tine gets into the cutting area of the knife, the tine is cut or shortened, respectively, by the knife blades. In this case, no damage is produced on the mower knife or on the knife drive. Such a tine can, for example, be exchanged during schedule maintenance.

Several embodiments of reel tines that are made from a plastic material are described in EP 0 475 405 A2. The tine is formed with a slotted eye-let for attachment onto the support body. The slotted eye-let is elastically expanded so that the tine, with its attachment area, can spring back after being pushed on. In this condition, attachment of the tine can be achieved by attachment bolts, or if necessary, additionally in connection with clamps and pins, to achieve locking, as via the support body a torque is introduced into the tine. The danger exists that, when harvesting goods accumulate on or when the tine hits a rigid object, an overload is produced. Different from a tine made from spring steel wire, a tine made from a plastic material has to be sufficiently elastic. During larger loadings, excessive bending and a non-regular circumferential position relative to the support body may be produced. This can lead, in the final effect, to breaking of the tine.

Tines are, however, also used in agricultural implements other than harvesting machines and reels, for example, in hay turning machines.

DE 177 83 79 U1 discloses, for example, a spring tine for a grass tedder, that is attached to a support body, for example an arm. The tine is bent from an integral steel rod. It has a rod-like gripping portion that contacts the grass. Furthermore, it has an attachment portion, bent into an eye-let, that attaches it, by means of a screw, onto the support body. A spring portion, an extending coil, is provided between the gripping portion and the attachment portion. In the opening, formed by the coil-like path of the spring portion, a sleeve, also mounted on the support body, engages the spring. Therefore, the tine is secured on the support body in a double manner. The rod-like gripping portion can avoid an obstacle in a pivoting manner around the spring axes determined by the retainment of the spring portion.

DE 178 20 043 U1 describes a tine for a spreading device, a tedder or rake, respectively. The rod-like tine includes a plastic material. Depending on the strength requirements, the rod-like tine can have reinforcement inserts. The required bending properties can, however, also be achieved by a corresponding design of the cross-sections. The tine is retained by screws on a carrying strap or similar support body.

SUMMARY

The present disclosure provides a tine that is made from a plastic material. Accordingly, damages to a mower blade can be prevented. The tine can be made from a relatively rigid plastic material and enables deflection during a corresponding loading without overloading occurring on the part made from the plastic material.

According to an aspect of the disclosure, a tine for an agricultural implement or self-propelled working machine to be attached onto a support body comprises a separate gripping element made from a plastic material. A separate attachment element is connected to the gripping element. The attachment element is made of a spring steel. The attachment element has a connection portion that is connected to the gripping element. The attachment element has an attachment portion it onto the support body. The attachment element has an elastic deflectable spring portion arranged between the attachment portion and the connection portion.

An advantage of the disclosure is that the common tine is made by combining a plastic material and a spring steel wire. This combination provides a rod-like gripping element made from a plastic material that can be used in the area where the danger exists that the tine may come into contact with other machine components, such as a mower sickle. Accordingly, no damages occur since cutting of the gripping element is possible without any adverse effect on the mower sickle. The plastic material can be cut through in an advantageous manner by the mower sickle.

At the same time overloading is prevented. Here the attachment element provides an elastic area that, in the case of a large loading, ensures that the gripping element can deflect. Preferably the attachment element is formed from a wire.

Advantageously, the spring portion of the attachment element, formed from a wire, is wound into the form of a coil. Wire portions projects from both ends of the coil. A first wire portion forms the attachment portion. The coil enables deflection. Also, since the coil is designed from a spring steel wire, it has a higher endurance. A second wire portion represents a connection portion to connect the gripping element. Alternatively, the second wire portion forms together with the spring portion to connect with the gripping element.

The connection portion of the attachment element is embedded in the gripping element. Thus, it is non-detachably connected to the gripping element. The connection portion can be inserted into the injection mold when manufacturing the gripping element. Thus, the connection portion is molded into the gripping element. Thus, the connection portion automatically forms a recess in the gripping element, which accommodates the connection portion, and thus at this portion a close connection is achieved.

The gripping element may be detachably connected to the connection portion of the attachment element. Thus, it is possible to exchange the plastic gripping element, without any problems, in the case that it is damaged. Accordingly, one can still use the attachment element that is made from spring steel. Such an exchange is possible in a simple manner. Furthermore, the plastic gripping element represents a cost-effective component. The costs for the exchange are correspondingly low.

In the detachable embodiment, the gripping element has a recess at one end. The connection portion engages the recess and is detachably held by a fixation mechanism.

The recess comprises a first recess portion that engages the wire portion. A second recess portion at least partially accommodates the coil that forms the spring portion. In this case it is possible for the second accommodation portion to hold the spring portion at its ends transversally to the axis generated by the coil via wall portions. If necessary, the wall portions have, respectively, a bore. A fixing bolt is guided through the bore and through the spring portion. The fixing bolt can be represented by a screw with or without a nut.

Alternatively, the wall portions include elastic latch arms that have latch projections to engage within the spring portion to provide a fixing assembly. A further attachment possibility for the gripping element on the attachment element is a clamping body arrangement. Here, the second wire portion, forming the connection portion, extends in a straight line. The gripping element recess has a first recess portion, in the form of a bore, adapted to receive the second wire portion. A pocket-like second recess portion receives the clamping body arrangement to retain, by a screw or directly themselves, the connection portion.

Spring steel wire can be used to form the attachment element. Here, the wire forming the connection portion is bent into a U. A screw or a pin is passed between the two legs forming the U and rests in bores of the gripping element crossing the recess. Thus, an advantageous attachment is achieved. Besides the fixation by a screw, also the possibility exists to form one of the legs in an elastic manner. The leg engages an indentation in the recess and thus provides fixation. If, then, for example, this indentation is accessible from outside, via a bore, a tool can be inserted from the outside into the bore and press one of the legs towards the other so that a pulling-off of the gripping element is possible.

The fixation portion of the attachment element is bent into an eye-let. A screw or a pin or any other means can be passed through the eye-let to retain the reel tine on the support body of the reel. Additionally, two tines can be combined in such a manner with each other, that they have a joint attachment portion.

Alternatively, it is possible, to manufacture the attachment element from a flat material, such as a flat spring elastic material. Thus, the spring portion is provided in the form of a leaf-spring. The attachment portion can, in this case, be bent relative to the spring portion and to the connection portion and have a hole. A screw or a different fixation mechanism can be passed through the hole to retain the attachment portion and, thus, the tine on the support body of a reel.

In order to retain the plastic gripping element on the flat attachment element, the connection portion of the attachment element can have a through bore. A screw or a pin is passed to engage in the bores of the gripping element. Thus, the screw crosses the recess where the attachment element is accommodated with its connection portion.

The gripping element may, depending on the application case, in the area that contacts the harvesting goods, extend straight with portions arranged under an angle relative to each other or be bent and have a convex and a concave side. Contours can be provided to achieve a stiffer construction of the plastic gripping element. As the spring properties are arranged to the attachment element, a stiffer construction is possible without the positive properties of the plastic gripping element being lost. However, any type of contour shape, leading to a stiff construction, can be selected.

The recess for accommodating the connection portion of the attachment element is preferably arranged in a thickened portion of the gripping element.

Depending on the application, the gripping element can be rod-like or flat according to a paddle-leaf type. Such leaf-like gripping elements are used with sensitive harvesting goods, for example sun flowers.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 1 is a side elevation view of a first embodiment of a tine attached onto a support body.

FIG. 2 is a rear elevation view of the tine according to FIG. 1.

FIG. 3 is a side elevation view of a second embodiment of a tine.

FIG. 4 is an elevation view in the direction of the arrow A of FIG. 3.

FIG. 5 is a side elevation view of a third embodiment of a tine.

FIG. 6 is an elevation view in the direction of the arrow B of FIG. 5.

FIG. 7 is a side elevation view of a fourth embodiment of a tine.

FIG. 8 is a rear elevation view of FIG. 7.

FIG. 9 is a side elevation view of a fifth embodiment of a tine.

FIG. 10 is a rear elevation view of FIG. 9.

FIG. 11 is plan view of a sixth embodiment with two tines combined to a double tine.

FIG. 12 is a side elevation view of a seventh embodiment of a tine.

FIG. 13 is a rear elevation view of FIG. 12.

FIG. 14 is a side elevation view of an eighth embodiment of a tine.

FIG. 15 is a rear elevation view of FIG. 14.

FIG. 16 is a side elevation view of a ninth embodiment of a tine.

FIG. 17 is a rear elevation view of FIG. 16.

DETAILED DESCRIPTION

Figures 18, 19:
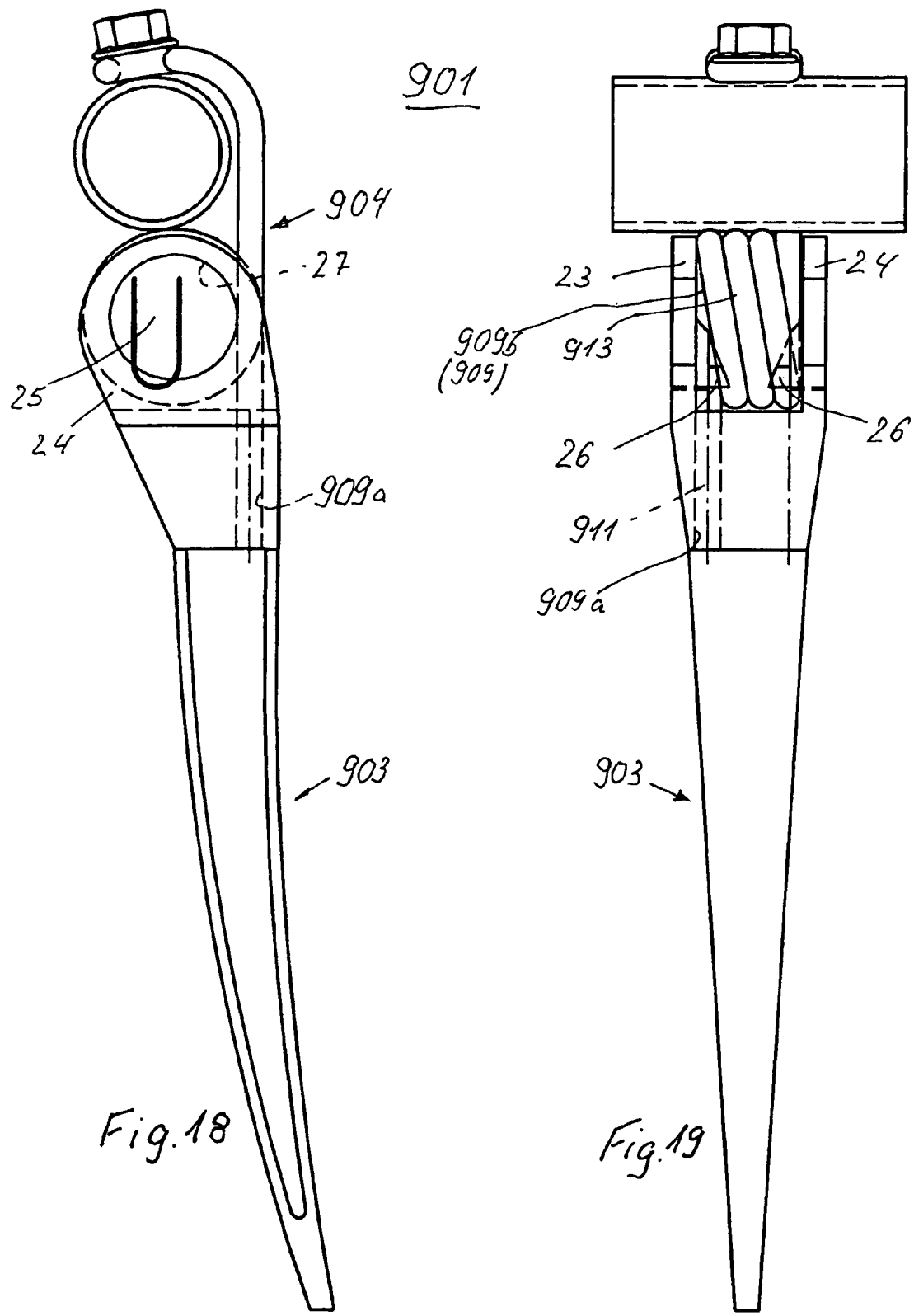
FIG. 18 is a side elevation view of a tenth embodiment of a tine.
FIG. 19 is a rear elevation view of FIG. 18.

The following description is merely exemplary in nature and is not intended to limit the present disclosure, application, or uses.

Following a first embodiment of a tine is described in detail using FIGS. 1 and 2.

In FIGS. 1 and 2, a tine 1 is shown arranged onto a support body 2. The support body 2 is a tube, which is, for example, rotatably mounted on the support element of a reel with a radial distance to the rotational axis of the reel. Due to the rotational movement of the support body 2, the position of the tine 1, in relation to the ground, can be changed along the rotational path of the reel. Also, the position can be changed with respect to the harvesting goods. The support body can also have a different shape for other applications of the tine.

The tine 1 includes a gripping element 3 and attachment element 4. In the present embodiment, according to FIGS. 1 and 2, the two are non-detachably connected to each other. The gripping element 3 has a first end 5 facing the attachment element 4 and, thus the support body 2 forms a thickened portion. The gripping element 3 extends like an elongated rod from the first end 5 to the second end 8. The gripping element 3 is, in this embodiment, slightly bent, so that it has a concave side 6 that contacts the harvesting goods. A convex side 7 faces away from the concave side 6. Profiles 10 can be provided starting from the first end 5 in a direction towards the second end 8. The profiles 10 end, however, in front of the second end 8. For a stiffer design and also for saving material, the gripping element 3 can be formed T-like, U-like, H-like or have a similar profile.

Towards the first end 5, the gripping element 3 forms a recess 9 that engages a connection portion 11 of the spring steel wire attachment element 4. The connection portion 11 and the gripping element 3 are, therefore, non-detachably connected to each other. In the manufacture of the gripping element 3, plastic can be injection molded around the connection portion 11 of the attachment element 4 in the mold to embed it into the gripping element 3. To improve the retainment of the connection portion 11 with the gripping element 3, formations or projections, roughening the upper face of the connection portion 11 can be provided. A significant length portion of the plastic gripping element 3 extends from the attachment element 4 so that a sufficient length of the plastic gripping element projects from the connection portion 11. Accordingly, in an application in a harvesting implement, if relative positional changes occur between the cutter bar and the reel, the gripping element 3 can be sheared off.

Furthermore, the attachment element 4 has an attachment portion 12, which forms, for example, an eye-let. A screw can pass through the eye-let to fix the tine 1 onto the support body 2. In the area between the connection portion 11 and the attachment portion 12, the attachment element includes a spring portion 13. This spring portion 13 is represented by a helical spring, which generating axis is generally aligned parallel to the longitudinal axis of the support body 2 or extends at a right angle to the extension of the gripping element 3. Thus, it is possible that excessive loading or impact loading that acts on the gripping element 3 can be elastically absorbed by the spring portion 13. The gripping element 3 can deflect and it is thus protected against overstressing. Thus, it is also possible not to have to manufacture the gripping element 3 from a flexible plastic material but to manufacture it from a relative stiff plastic material and to design it in a stiffer manner. The elastic properties are provided by the attachment element 4 made from spring steel.

A transition portion 14 is provided between the spring portion 13 and the eye-let-like formed attachment portion 12. The transition portion 14, in the shown embodiment, serves to provide the necessary distance between the spring portion 13 and the attachment portion 12, to accommodate the support body 2 therebetween. The support body 2 may have any shape. It is not limited. A strip shape or any shape can also be used. In this case, the attachment portion 12 needs to be adapted to its shape, if necessary. In other connection types relative to the support body, such a transition portion can be eliminated.

A second embodiment of a tine 101 according to the disclosure is described in detail with reference to FIGS. 3 and 4. The essential difference between the embodiment of FIGS. 1 and 2 and the embodiment of FIGS. 3 and 4 is that the gripping element 103 of the tine 101, made from a plastic material, is a separate component. The gripping element 103 is detachable from the attachment element 104, which is made from spring steel. The tine 101 includes two elements formed separately from each other, namely the gripping element 103 and the attachment element 104. The gripping element 103 is formed differently in the area of its first end 105, formed as a thickened portion. In this area, a recess 109 is provided. The attachment element 104 is detachably accommodated by its connection portion 111 in the recess 109. The attachment element 104 has a U formed in the area of the connection portion 111. The spring steel wire that forms the attachment element 104 is bent into a U shape to form a first leg 111a and a second leg 111b. The legs 111a, 111b extends parallel to one another and are connected to each other by a web of the U.

The intermediate space between the two legs 111a, 111b is used to receive a screw 115 when the connection portion 111 is inserted into the recess 109. The gripping element 103 has a bore 16 intersecting the recess 109. At both sides of the recess 109, bore portions are formed like pockets so that the shaft of the screw 15 passes between the two legs 111a and 111b and is arranged close to the web of U. Thus, generally zero backlash is provided. Furthermore, the two legs 111a and 111b extend with respect to one another so that a biasing of the legs 111a, 111b acts on to the boundary of the recess 109 to hold the gripping element 103 essentially without play in the recess 109. The screw 15 can be formed as a head screw with a self-cutting thread. The screw cuts its thread into the bores 16 at both sides of the recess 109. Thus, it is possible, in the case, where a partial portion of the gripping element 103 is sheared off in the direction towards the second end 108, to only exchange the gripping element 103. This simply happens by detaching the screw 15 and fixing a new gripping element 103 onto the connecting portion 110.

Furthermore, the remaining components and portions of the gripping element 103 as well as of the attachment element 104 correspond to the embodiment of FIGS. 1 and 2. Accordingly, comparable parts relative to FIGS. 3 and 4 have been given reference numerals corresponding to like parts of the embodiment of FIGS. 1 and 2 that are increased by the numerical value of 100. For their description, refer to the description of FIGS. 1 and 2.

Incidentally, for the attachment of the gripping element 103 designs other than a screw 15 are possible. Thus, it is possible to have the two legs 111a and 111b extend under an angle relative to each other and to provide an undercut in the recess 109 behind which the end of the leg 111b is received so that a retainment against pulling-out is provided. Thus, a screw driver can be inserted into a notch in the gripping element 103 to deform the leg 111b to move it in the direction towards the leg 111a and thus out of engagement with the undercut. Accordingly, the gripping element 103 then can be pulled off the attachment element 104.

A third embodiment of a tine 201 is described according to FIGS. 5 and 6. The gripping element 203 corresponds to the gripping element 103 according to FIGS. 3 and 4. In FIGS. 5 and 6, reference numerals are selected that are increased by a numerical value of 100 to those of the embodiment according to FIGS. 3 and 4. Thus, for their description, refer to the description in connection with FIGS. 3 and 4.

In FIGS. 5 and 6, the attachment element 204 of the tine 201 is formed differently from the embodiment according to FIGS. 3 and 4. In this embodiment, the attachment element 204 is formed from spring steel as a leaf-type spring. It has a connection portion 211 with a through bore 17. The connection portion 211 enters the recess 209 of the gripping element 203. The fixation mechanism 215, formed as a screw, enters the bore 216 and is passed through the bore 17. Thus, the gripping element 203 is retained on the attachment element 204. Starting from the connection portion 211 extending into the recess 209, a leaf-spring-like acting spring portion 213 is provided in the direction towards the attachment portion 212. The cross-section of the attachment element 204 in the area of the spring portion 213 is such, that, when loading the gripping element 203 in the area of the concave side 206, an elastic bending of the spring portion 213 is achieved. The cross-section in the direction from the concave side 206 to the convex side 207 of the attachment element, has in the crosswise area of the spring portion 213, a smaller material thickness. In the area between the spring portion 213 and the attachment portion 212, a curved transition portion 214 is provided. The transition portion 214 is adapted to the support body formed correspondingly to FIG. 1. Instead of the eye-let design of the attachment portion in the embodiment of FIGS. 1 to 4, a hole 18 is provided in the embodiment according to FIGS. 5 and 6. A fixation element is passed through the hole 18 to retain the reel tine 201 on a support body. In the embodiment according to FIGS. 1 to 4, flexibility of the spring portion is provided when loading the concave side 206, and transversally thereto. Thus, a lateral deflection of the gripping element 203 is possible. In the embodiment according to FIGS. 5 and 6, a deflection is essentially only provided when loading the concave side 206 in the drawing plane of FIG. 5. Thus, a deflection is only achieved in the lateral direction, to the left and right, using the spring properties of the spring portion 213.

In FIGS. 7 and 8, a fourth embodiment of a tine 301 according to the disclosure is shown. Tine 301 differs from the embodiment according to FIGS. 1 and 2 only in the modified design of the gripping element 303. Parts and portions of the components, which correspond to those of the embodiment according to FIGS. 1 and 2, are identified with reference numerals that are increased by the numerical value 300, compared to those according to FIGS. 1 and 2. For their description, refer to the description of FIGS. 1 and 2.

The gripping element 303 is rod-like in FIGS. 7 and 8. Profiles 310, instead of the ribs, are arranged on the convex side as in FIGS. 1 and 2. The profiles 310, in cross-section, lead to an H-shape of the gripping element 303. The profiles 310 also lead to a stiffened connection with the web arranged therebetween. In FIGS. 7 and 8, the gripping element 303 is, as in FIGS. 1 and 2, non-detachably connected to the attachment element 304.

FIGS. 9 and 10 show views of a fifth embodiment of a tine 401. The parts and portions that correspond to those of the embodiment of FIGS. 5 and 6 include reference numerals increased by the numerical value 200 compared to those of FIGS. 5 and 6. In the tine 401 according to FIGS. 9 and 10, the construction of the attachment element 404 corresponds to that of FIGS. 5 and 6. Also, it includes a hole 18 at the attachment portion 412, as in FIGS. 5 and 6, visible in FIG. 5. Additionally, it includes the connection portion through bore 17, according to FIG. 5, to detachably connect the gripping element 403 to the attachment element 404 by the screw 415, that serves as a fixation mechanism. The attachment element 404 is also leaf-spring-like, as in the embodiment according to FIGS. 5 and 6. The design of the gripping element 403 differs from that according to FIGS. 5 and 6. No ribs are provided on the gripping element 403 arranged on the convex side. Here, the gripping element 403 includes a profile 410 with an H-like cross-section.

FIG. 11 illustrates a sixth embodiment. Here, two tines 501 are coupled to each other so that they can be mounted together on a support body 2. The two gripping elements 503 correspond to the gripping elements of FIGS. 3 and 4 with the modifications described in connection with FIGS. 9 and 10. In the embodiment according to FIG. 11 the construction of the attachment element 504 corresponds to that described in connection with FIGS. 3 and 4 for the attachment element 104. The difference is that two attachment elements 504 are connected to each other by a bridging portion 19. This bridging portion 19 also has the attachment portion 512. The attachment portion 512 is formed like an eye-let. Thus retainment of the so-called double tine, which includes two reel tines 501, can be achieved by a screw on the support body 2. The bridging portion 19 is dimensioned so that the two reel tines 501 are held with necessary distance between them.

The design of the two attachment elements 504 otherwise corresponds to the attachment element 104 according to FIGS. 3 and 4. Thus, for its description, refer to the description of these Figures. This is also valid for the embodiment of the connection between the attachment element 504 and the respective gripping element 503.

FIGS. 12 and 13 illustrate a seventh embodiment of a tine 601. The gripping element 603 in contrast to the gripping element, according to FIGS. 3 and 4, is formed as a flat paddle leaf type.

The connection between the attachment element 604 and the gripping element 603 corresponds to the embodiment described in connection with FIGS. 3 and 4. Thus, concerning its description, refer to the description of FIGS. 3 and 4.

The attachment element 604 differs from that according to FIGS. 3 and 4 only in the design of the attachment portion 612. In the embodiment according to FIGS. 12 and 13, an eye-let is chosen for the attachment onto the support body 2. The screw that fixes the attachment element 604 on the support body 2 is passed through the attachment portion 612 in form of an eye-let. The attachment portion 612 is arranged as the lengthening of the connection portion 611.

FIGS. 14 and 15 illustrate an eighth embodiment of a tine. The attachment element 704 differs from FIGS. 3 and 4 in that it has a straight extending connection portion 711. In order to achieve a tight connection between the gripping element 703 and the attachment element 704, a clamping member arrangement 20 is provided. The clamping member arrangement 20 is tightened by a screw 715 against the connection portion 711. The gripping element 703 has a recess 709 with a first recess portion 709*a* that accommodates an end portion of the connection portion 711. A second recess portion 709*b* accommodates the clamping member arrangement 20. The clamping member arrangement 20 has a threaded bore 21. In the second recess portion 709*b* a bore 716 ends, through which the screw 715 can be inserted into the threaded bore 21 of the clamping body arrangement 20. The connection portion 711 of the attachment element 704 is inserted into the first recess portion. It is held in a clamped manner between the clamping member arrangement 20 by tightening of the screw 715.

FIGS. 16 and 17 illustrate a ninth embodiment of a tine 801. The tine 801 differs from to the tine in FIGS. 14 and 15 in that a deflector 22 is added. The deflector 22 is arranged in front of the coil-like spring portion 813 of the attachment element 804. The deflector 22 should prevent the harvesting goods from entering between the windings of the spring portion 813. Further, the essential portions and components are provided with reference numerals increased by a numerical value of 100 to 800 compared to those according to FIGS. 14 and 15. For their description, refer to FIGS. 14 and 15.

FIGS. 18 and 19 illustrate a tenth embodiment of a tine 901. The attachment element 904 corresponds to that of the eighth and ninth embodiment. However, the connection between the gripping element 903 and the attachment element 904 is different. The gripping element 903 has a recess 909 with a first recess portion 909*a* and second recess portion 909*b*. The first recess portion 909*a* is represented by a bore to accommodate the connection portion 911. The second recess portion 909*b* is limited laterally by two wall portions, the first wall portion 23 and the second wall portion 24. Each wall portion 23, 24 has an elastic latch arm 25 with a latching projection 26, projecting into the second recess portion 909*b*. The attachment element 904 is accommodated with a part of the spring portion 913 between the two wall portions 23, 24. The latching projections 26 engage in the through opening 27 of the spring portion 913.

Figure 20:
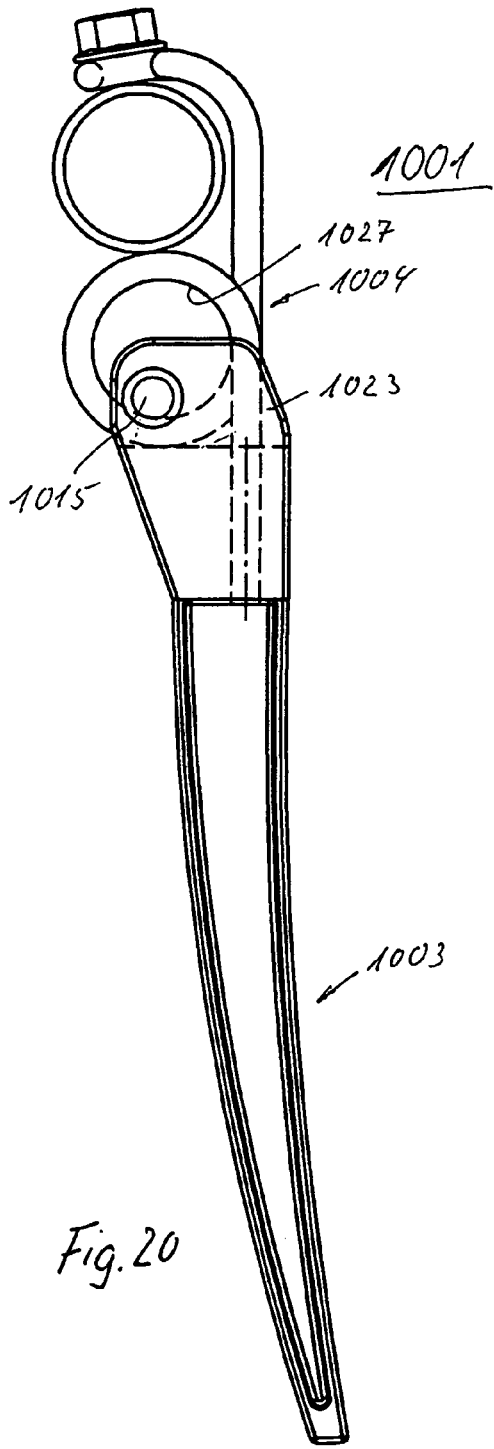
FIG. 20 is a side elevation view of an eleventh embodiment.
Figure 21:
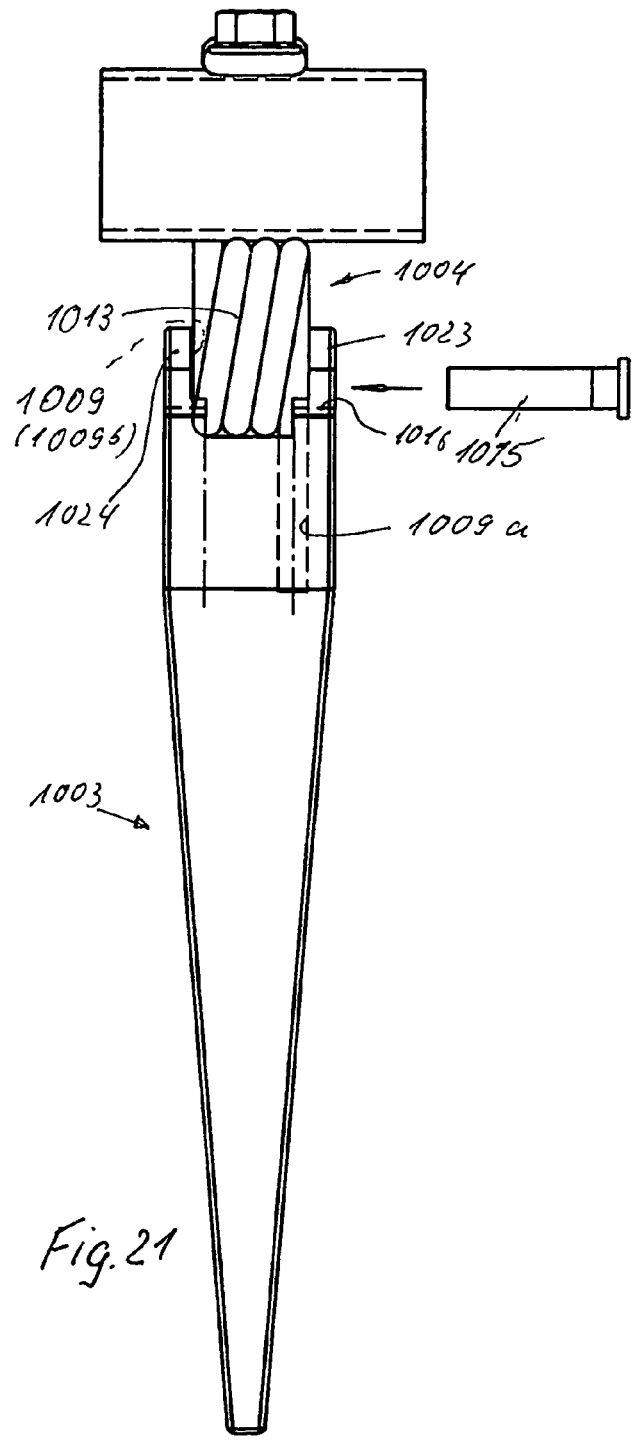
FIG. 21 is a rear elevation view of FIG. 20.

An eleventh embodiment of a tine 1001 is illustrated in FIGS. 20 and 21. The embodiment differs from the tenth embodiment in that instead of the latch arms 25 and the latching projections 26 an attachment bolt 1015, in the form of a socket pin or a screw is used. The bolt 1015 is retained in the bores 1016 in the two wall portions 1023, 1024 of the gripping element 1003. The bolt 1015 is passed through the through opening 1027 of the attachment element 1004.

The present disclosure has been described with reference to the preferred embodiments. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A tine for an agricultural implement or self-propelled working machine for attachment to a support body comprising:

a separate tine having a gripping element at one end, the tine being made from a plastic material;

a separate attachment element, said attachment element is connected to the gripping element, said attachment element is one piece and made from a spring steel, said attachment element includes a connection portion that is connected to the gripping element, said attachment element has an attachment portion that directly attaches onto the support body, said attachment element has an elastically deflecting spring portion arranged between the attachment portion and the connection portion, said attachment element is formed from a wire, wherein the spring portion of the wire is wound to form a coil, the coil has two ends that project away from one another, and a first wire portion projects from one end of the coil and a second wire portion projects from the other end of the coil, said first wire portion forms the attachment portion and said second wire portion forms, together with the spring portion, the connection portion for connecting to the gripping element, the second wire portion extends a desired distance from the coil into and couples with the gripping element.

2. The tine according to claim 1, wherein the connection portion extends over a part of the length of the gripping element and is non-detachably embedded in the gripping element.

3. The tine according to claim 1, wherein the gripping element is detachably connected to the connection portion of the attachment element.

4. The tine according to claim 1, wherein the gripping element has a recess at one end, said recess receives the connection portion which is detachably held by a fixation mechanism.

5. The tine according to claim 4, wherein the recess comprises a first recess portion that engages the second wire portion, and a second recess portion that receives the coil forming the spring portion.

6. The tine according to claim 5, wherein the second recess portion holds the spring portion at its ends transversally to a generating axis of the coil by wall portions.

7. The tine according to claim 6, wherein the wall portions each have, respectively, a bore, the fixation mechanism, in the form of an attachment bolt, is passed through the bores and the spring portion to fix the attachment element with the gripping element.

8. The tine according to claim 7, wherein the attachment bolt is a screw with or without a nut.

9. The tine according to claim 6, wherein the wall portions have elastic latch arms with latching projections to engage the spring portion.

10. The tine according to claim 4, wherein the wire is bent into a U-shape forming the connection portion and a screw or a pin is passed between two legs of the U-shape, the screw or pin rest in bores of the gripping element crossing the recess.

11. The tine according to claim 1, wherein the attachment portion of the attachment element is bent to form an eye-let.

12. The tine according to claim 1, wherein the gripping element is bent and forms a convex side and a concave side.

13. The tine according to claim 4, wherein the recess is arranged in a thickened portion of the gripping element.

14. The tine according to claim 1, wherein the gripping element has profiles.

15. The tine according to claim 1, wherein the gripping element has a rod-like configuration.

16. The tine according to claim 1, wherein the gripping element is the form of a flat paddle-leaf.

17. A tine for an agricultural implement or self-propelled working machine for attachment to a support body comprising:
- a separate tine having a gripping element at one end made from a plastic material;
- a separate attachment element, said attachment element is connected to the gripping element, said attachment element is one piece and made from a spring steel, said attachment element includes a connection portion that is connected to the gripping element, said attachment element has an attachment portion that directly attaches onto the support body, said attachment element has an elastically deflecting spring portion arranged between the attachment portion and the connection portion;
- said attachment element is formed from a wire, wherein in the spring portion of the wire it is wound to form a coil;
- a first wire portion and a second wire portion projects from both ends of the coil, said first wire portion forms the attachment portion and said second wire portion forms together with the spring portion the connection portion for connecting to the gripping element, said second wire portion extends in a straight line;
- the gripping element has a recess at one end, said recess receives the connection portion which is detachably held by a fixation mechanism, said second wire portion extends in a straight line; and
- the recess comprises a first recess portion in the form of a bore adapted to receive the second wire portion and a second recess portion that is pocket-like and receives a clamping member arrangement that retains the connection portion.

* * * * *